(12) United States Patent
Nguyen

(10) Patent No.: US 6,973,471 B2
(45) Date of Patent: Dec. 6, 2005

(54) METHOD AND APPARATUS FOR IMPLEMENTING SIGNED MULTIPLICATION OF OPERANDS HAVING DIFFERING BIT WIDTHS WITHOUT SIGN EXTENSION OF THE MULTIPLICAND

(75) Inventor: Trinh Huy Nguyen, Pflugerville, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 623 days.

(21) Appl. No.: 10/081,431

(22) Filed: Feb. 22, 2002

(65) Prior Publication Data

US 2003/0163503 A1    Aug. 28, 2003

(51) Int. Cl.[7] ............................................. G06F 7/52
(52) U.S. Cl. .................... 708/627; 708/628; 708/629
(58) Field of Search .................................. 708/627–629

(56) References Cited

U.S. PATENT DOCUMENTS

| | | | |
|---|---|---|---|
| 5,880,985 A | 3/1999 | Makineni et al. | |
| 5,943,250 A | 8/1999 | Kim et al. | |
| 6,081,823 A * | 6/2000 | Purcell et al. | 708/629 |
| 6,272,513 B1 * | 8/2001 | Douzono et al. | 708/628 |
| 6,347,326 B1 * | 2/2002 | Jensen et al. | 708/625 |
| 6,415,311 B1 * | 7/2002 | Purcell et al. | 708/629 |
| 6,446,104 B1 * | 9/2002 | Tzeng et al. | 708/503 |
| 2002/0040379 A1 * | 4/2002 | Amer | 708/523 |
| 2003/0005016 A1 * | 1/2003 | Tzeng et al. | 708/628 |

* cited by examiner

*Primary Examiner*—D. H. Malzahn
(74) *Attorney, Agent, or Firm*—James L. Clingan, Jr.; Robert L. King

(57) ABSTRACT

A multiplier (42) forms a product from two signed operands without performing a sign extension of the multiplicand (A). A modified Booth's recoding of the multiplier operand (B) is begun immediately without being delayed by a sign extension operation. While recoding and partial product generation is occurring, a determination is made in parallel whether or not a sign extension adjustment term must be created. When needed, a value equal to $(-B)(2^N)$, where N is equal to a bit width of the multiplicand (A), is formed in parallel with the recoding and partial product generation. The sign extension adjustment term is coupled to a plurality of carry save adders (49, 51, 53) that compress a plurality of partial products to a sum term and a carry term. A final add stage combines the sum term and carry term to provide a product with correct sign extension.

20 Claims, 3 Drawing Sheets

METHOD AND APPARATUS FOR IMPLEMENTING SIGNED MULTIPLICATION OF OPERANDS HAVING DIFFERING BIT WIDTHS WITHOUT SIGN EXTENSION OF THE MULTIPLICAND

FIELD OF THE INVENTION

This invention relates to signed multiplication and more particularly to signed multiplication in which signed operands have differing bit widths.

BACKGROUND OF THE INVENTION

A common function required in processing is multiplication. Multipliers are fairly complex circuits requiring significant amount of space on a semiconductor die to manufacture. Thus it is desirable to have just one multiplication circuit for performing a variety of multiplication needs. Two of the complicating factors relating to multiplication are that some of the operands may be signed, meaning they may be plus or minus, and another complicating factor is that they may have differing widths in that some may be, for example, 32 bits and others may be 16 bits.

In addressing the multiple width issue with signed operands, there have been primarily two solutions. One is simply to pay the penalty for having multiple multipliers and to have a different multiplier for each width so that the signed bit is located in the same spot and the technique for multiplying is the same for every multiplication that occurs for that multiplier. Another technique is to use a single multiplier for all of the different bit widths that the processor encounters and use sign extension. In such case when the operands are signed and are negative and the bit width is relatively small compared to the width of the register, the technique has been to fill the remaining spots with the sign information which is called sign extension. Sign extension has been effective but it requires that the extensions on an operand occur prior to the beginning of multiplication on that operand.

With bit sizes 32 and below this has not been a significant problem because other operations are required to set up the multiplication that can occur simultaneously with the sign extension operation. However, as bit sizes extend beyond 32 to, for example, 64 bit widths, the amount of sign extension becomes very significant. For example in a 64 bit register width and an operand of 16 bits, a sign extension of 48 bits is required. Although a portion of this sign extension can occur during the setup for the multiplication, a relatively significant amount extends beyond that. Thus the sign extension has become a significant factor in the overall time required for multiplication. Thus there is a need for reducing the time for multiplication for a multiplier that can handle both signed operands and differing bit widths.

BRIEF DESCRIPTION OF THE DRAWINGS

The present invention is illustrated by way of example and not limited by the accompanying figures, in which like references indicate similar elements, and in which.

DETAILED DESCRIPTION OF THE DRAWINGS

A multiplier useful in multiplying operands of differing widths that are signed utilizes a sign extension adjustment term calculated during the normal multiplication process. The multiplication begins as if the sign is not important and the portion of the multiplicand that would normally be filled by the sign extension is then multiplied by the multiplier to achieve a sign extension adjustment term. This term is effectively a partial product which is simply the negative of the multiplier times 2 to the N power where N is equal to the number of bits in the multiplicand. Thus the term is relatively easy to determine for a given multiplication. This is better understood by reference to the figures.

Figure 1:
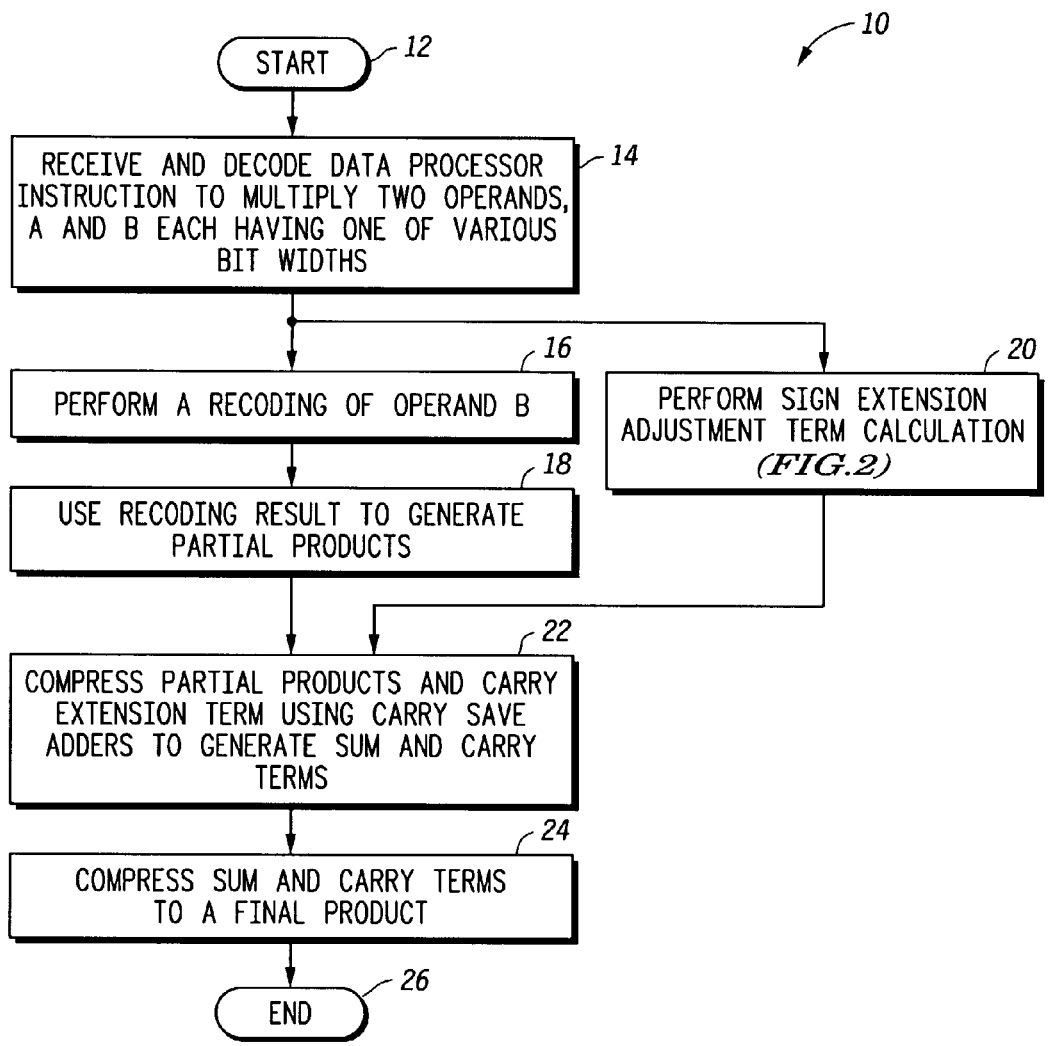
FIG. 1 is a flow diagram of an embodiment of the invention.

Shown in FIG. 1 is a flow diagram beginning with a start 12 and various method steps 14, 16, 18, 20, 22, and 24. The method begins with a receive and decode data processor instruction that states that two operands, A and B, are to be multiplied. These operands can be a maximum width based on the register that is available for the particular processor. For example, for a relatively wide register, the width may be 64 although other widths are clearly contemplated such as 128 and perhaps even wider. They can also be narrower than 64. For a typical multiplication operation there is a multiplicand and a multiplier. These two can be interchanged from a functional result but in terms of how the multiplication is actually performed there is a difference. The multiplicand is considered operand A, and the multiplier is considered operand B. According to a typical multiplication operation, the recoding of operand B is shown as being performed in method step 16. Subsequently the recoding result is used to generate partial products as shown in method step 18. Steps 16 and 18 may be conveniently performed by a modified Booth's algorithm, which is the common technique used for multiplying in present day processors. These partial products are subsequently added together as shown in method step 22. While method steps 16 and 18 are being performed, the sign extension adjustment term is also calculated. This adjustment is equivalent to a partial product and is put into a form which is useful to be added as a partial product. The sign extension adjustment term can thus be conveniently added to other partial products using conventional summation of partial product techniques. The most common technique is a carry-save-adder technique shown in FIG. 1 as method step 22. The process is completed by performing a compress sum and carry step in order to achieve the final product as desired as shown as method step 24.

Figure 2:
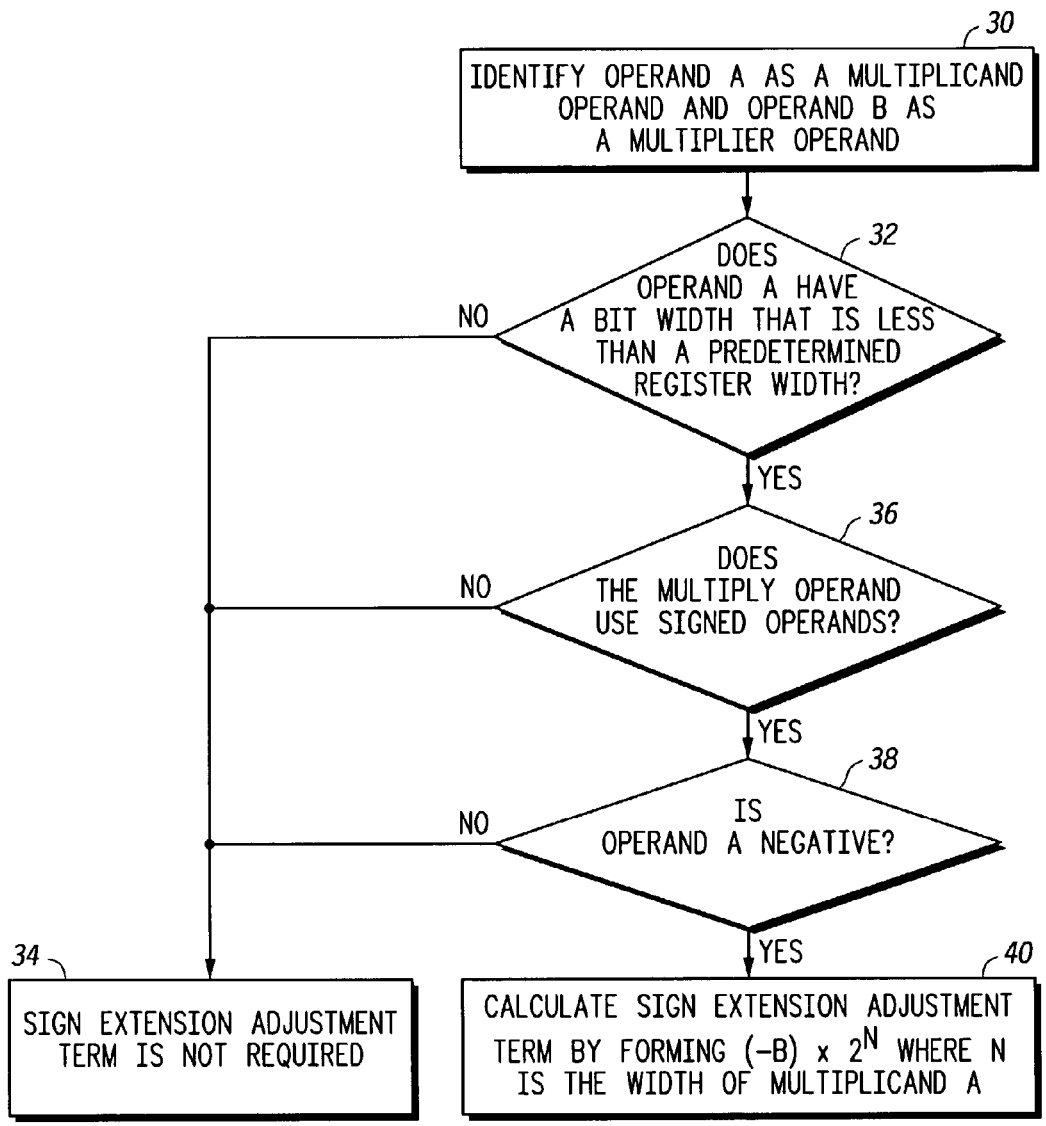
FIG. 2 is a flow diagram in more detail of a portion of the flow diagram of FIG. 1.

Shown in FIG. 2 is a more detailed method flow diagram for the method step 20 shown in FIG. 1 comprising steps 30, 32, 34, 36, 38, and 40. As shown in FIG. 2 in step 30, the first step is to identify the operand A as the multiplicand and operand B as the multiplier operand. Then a determination is necessary in step 32 as to whether the bit width is less than the predetermined register width. If it is the same as the register width, then there is no need for the sign extension adjustment term and the other steps are not necessary as shown in step 34. Another step 36 in the process then is to determine if the multiply operation uses signed operands. Again, if the answer is no then there is no need for the sign extension adjustment term and further steps are not necessary as shown in step 34. Another decision step is to determine if the operand is a negative number. If the answer is no, then again there is no need for the sign extension adjustment term, and there is thus no need to continue in an attempt to provide such sign extension adjustment term. If the answer to these three questions is yes, however, the next step is to determine what the sign extension adjustment term should be.

The sign extension adjustment term has been found to be the negative of the multiplier operand B multiplied by 2 to the N power where N is the width of multiplicand A. Thus the only real calculation necessary in order to determine the sign extension adjustment term is determining the width of the multiplicand. After determining the width of the multiplicand, there is a calculation necessary to achieve the sign extension adjustment term in a form that is useful. That the sign extension adjustment term is minus B times 2 to the N can be seen by the way the multiplication can be viewed. When the multiplicand is less than the register width, then there are a number of zeroes preceding the multiplicand. In order for the necessary sign adjustment to be made in the case where it is a negative number, all of those zeroes become 1. This would be equivalent to a sign extension that was previously used prior to beginning the multiplication of that multiplicand. These ones that would be placed in front of the multiplicand indicate the number minus 1. However, since the sign extension is not performed, that is those zeroes are not converted to 1, the multiplication begins with those bit locations that precede the multiplicand all being zero. But in actuality, in order to achieve the right number for the multiplicand, all of those zeroes should have been 1, which when they are all 1 indicate, as stated before, minus 1. Thus the portion that is not included in the multiplication that begins immediately, is minus 1 times the multiplier but that "minus 1" has a number of zeroes after it. The number of zeroes after it are the multiplicand numbers that fill the bit locations.

Thus, for example, if the register is 64 bits but the multiplicand if 32, then there are 32 zeroes after all the ones that indicate minus 1. All of those zeroes actually indicate a power of 2 when viewed as the number that is actually being multiplied so the multiplier times minus 1 but with all the zeroes in the multiplicand bit locations present is effectively minus 1 times the multiplier times 2 to the power equal to the number of bits in the multiplicand.

|a (48–63)|b (32–47)|c(16–31)|d(0–15| multiplicand times |e(16–31)|f(0–15| multiplier If the multiplicand is 32 bits, then byte locations a and b are considered to be zero for calculation purposes, but if the multiplicand is negative, then they should be all ones to be an accurate representation of the number. The multiplication begins with a and b considered all zero to avoid the time consuming sign extension of filling a and b with all ones. Thus, the error amount of this calculation with a negative multiplicand of 32 bits can viewed as e and f times a and b with a and b in the all ones condition, the condition necessary to make the number negative. That is, after the e and f times c and d calculation, the missing term is e and f times a and b. Thus, this e and f times a and b can be viewed as a partial product. This partial product analogy is valid if c and d are considered all zeroes. Thus, a and b in the all ones condition represent minus 1 and c and d represent 32 powers of 2. Thus, this partial product is minus e and f (the multiplier) times 2 to the $32^{nd}$, 32 being the number of bits of the multiplicand.

Because this is equivalent to a partial product, it can be added to the partial products being calculated as part of the carry/save operation. Thus with the sign extension adjustment term, for the case when the multiplicand is negative, being in the form of a partial product, it can be conveniently added as part of the process shown in step 22.

There may be other techniques for achieving the desired integration with the partial products of step 22 with the sign extension adjustment as well. It may be possible to provide simply the minus B (minus of the multiplier) as an inversion of B, appending ones equal to the number of bits of the multiplicand, and then having the 1 added to it to achieve the desired sign extension adjustment term. The added 1 may be achieved by loading a 1 into a bit location of a partial product which is always a zero. For example, there may be an unused location in one of the partial products provided in step 22 where a zero is always present. It is this location that can be loaded with a 1 and thus have the affect of adding a 1 to the inversion of B plus appended ones.

After the method step 22, which utilizes the sign extension adjustment term, then the final step is to compress the sum and carry terms to a final product as shown in method 24 and then that is the end of the multiplication process as shown as the end 26 in FIG. 1.

Figure 3:
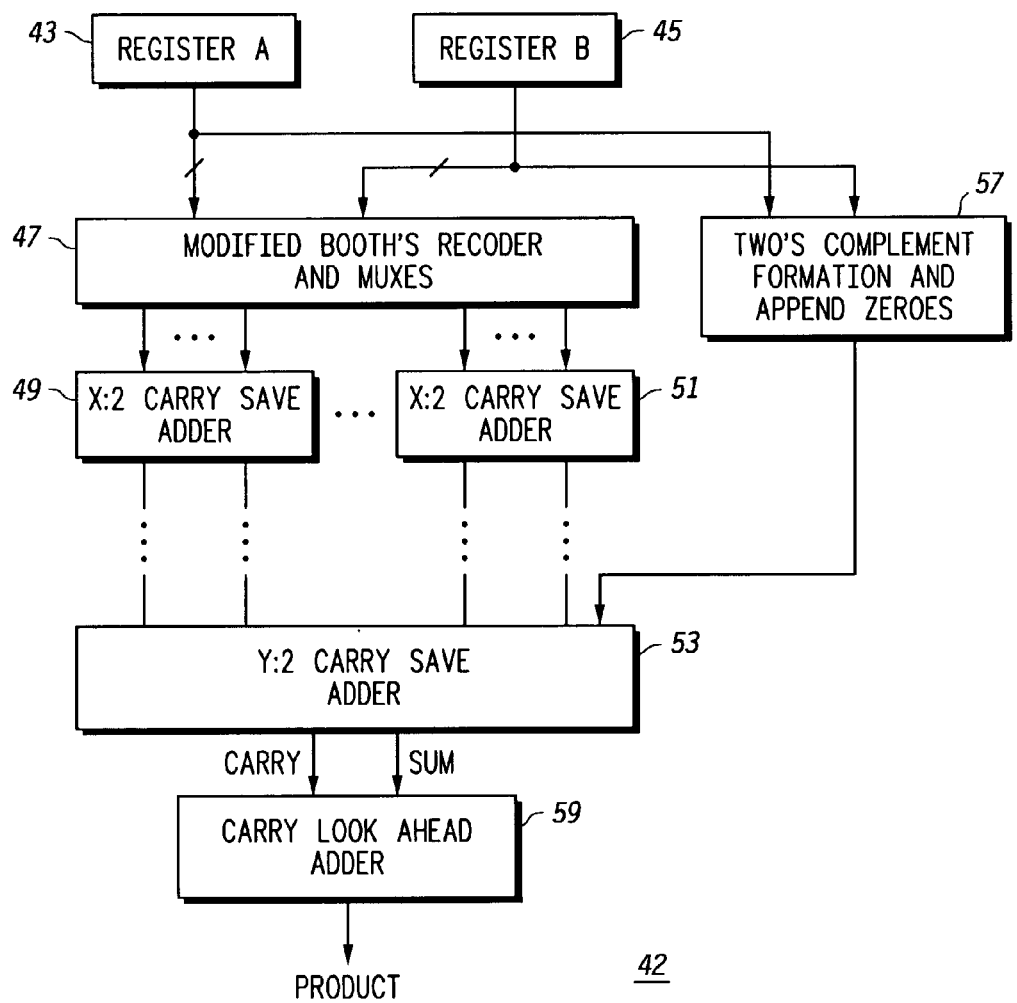
FIG. 3 is a multiplier according to the preferred embodiment of the invention.

Shown in FIG. 3 is a multiplier 42 comprising a register A 43, a register B 45, a modified Booth's recorder and multiplexers 47, an X to 2 carry/save adder 49, an X to 2 carry/save adder 51, a Y to 2 carry/save adder 53, a two's complement formation and append zeroes block 57, and a carry/look ahead adder 59. Register A 43 receives the multiplicand, and register B 45 receives the multiplier. The operation commences with modified Booth's recoder and multiplexers 47 beginning the multiplication process on the multiplicand in register A 43 and the multiplier in register B 45 as these multipliers and multiplicands are received. Thus there is no adjustment to the entry in register A 43 even if it is a negative number.

If the multiplicand present in register A is a signed negative number with less than the bit width of register A, then the two's complement formation and append zeroes block 57 provides the sign extension adjustment term to Y to 2 carry/save adder 53. As seen in FIG. 3, two's complement formation and append zeroes block 57 is in parallel with the modified Booth's recorder multiplexer as well as X to 2 carry/saver adders 49 and 51. The Y to 2 carry/save adder takes into account the sign extension adjustment term that is calculated by the two's complement formation and append zeroes block 57. The effect of calculating the sign extension adjustment term is to perform a two's complement on the multiplier present in register B and then append zeroes equal in number to the width of the multiplicand present in register A. Two's complement operation generally requires inversion and then an increment of the number. The inversion is very fast and very low in its consumption of circuit area. An incrementer is a little more cumbersome. However, there is plenty of time to perform this function compared to the time involved in performing the modified Booth's recorder and multiplexing as well as the carry/save adder function provided in blocks 49 and 51. Thus the block 57, using an incrementer, provides the sign extension adjustment term well before the carry/save adder 53 can use it.

There will be an additional term to be included in the carry/save adder function provided in 53 that could provide a slight increase in time required to perform the total function, but that is very small compared to the additional time required by performing a sign extension of, for example, 32 bits. As an alternative to the two's complement formation and append zeroes approach, the sign extension adjustment term can be achieved by appending zeroes to the multiplier present in register B equal to the bit width of the multiplicand in register A, then inverting, and then adding 1. The adding 1 may be conveniently achieved by inserting a 1 in a bit location of a partial product used in carry/save adder 53 that may be otherwise vacant. This vacancy is common in partial product situations in which a bit on the least significant side is vacant and has a zero stored in that location. Such a location can be utilized to store the 1 that results from the need for the sign extension adjustment term. Thus for those situations in which a sign extension adjustment term is to be provided to carry/save adder 53, that vacant bit would be written to a 1 and the remaining portion of the sign extension adjustment term would be provided to carry/save adder 53 for adding as a partial product.

Thus a time benefit for performing a multiplication is achieved because during the time the recoding circuitry is receiving the first and second operands and providing intermediate partial products, sign extension adjustment circuitry calculates and provides the sign extension adjustment term to the adder circuitry, which combines the partial products generated from the first and second operand and from the sign extension adjustment term. This parallel operation thus reduces the total time to multiply for multipliers that must handle multiplicands of variable bit widths that are signed. This operation is particularly beneficial when the maximum bit width is large, such as 64.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. Circuitry for multiplying a first signed operand of a first bit width and a second signed operand of a second bit width, comprising:
   recoding circuitry for receiving the first signed operand and the second signed operand and providing a plurality of intermediate partial products;
   sign extension adjustment circuitry coupled to the second signed operand, the sign extension adjustment circuitry providing a sign extension adjustment term that is equal to a negative value of the second signed operand multiplied by two raised to a power of N, where N is equal to the first bit width of the first signed operand; and
   adder circuitry coupled to the recoding circuitry and the sign extension adjustment circuitry for compressing the plurality of intermediate partial products and the sign extension adjustment term to provide a final product.

2. The circuitry of claim 1 wherein the recoding circuitry is a modified Booth's recoder.

3. The circuitry of claim 1 wherein the sign extension adjustment circuitry further comprises circuitry for forming a two's complement of the second signed operand and appending a zero bit value to a predetermined number of least significant bits of the two's complement.

4. The circuitry of claim 3 wherein the circuitry for forming is further characterized as being means for performing the two's complement by forming an inverse of the second signed operand and incrementing the inverse by one.

5. The circuitry of claim 1, wherein:
   the sign extension adjustment circuitry is further characterized as having means for appending zeroes to the second signed operand and then inverting the second signed operand with the appended zeroes to form an inverse, and coupling the inverse to the adder circuitry; and
   the adder circuitry is further characterized as having means for selectively adding one to the inverse when compressing the plurality of intermediate partial products.

6. The circuitry of claim 1 wherein the first bit width is equal to the second bit width.

7. The circuitry of claim 6 wherein the adder circuitry comprises a plurality of four/two and three/two carry save adders.

8. The circuitry of claim 1 wherein the first bit width is different from the second bit width.

9. The circuitry of claim 1 wherein the adder circuitry further comprises:
   a plurality of multiple input/two output carry save adders (CSAs) and a carry lookahead adder for providing the final product.

10. In an electronic circuit, a method for multiplying a first signed operand having a negative value and a second signed operand, comprising:
    storing the first signed operand and the second signed operand in a storage circuit;
    generating a plurality of partial products from the first signed operand and the second signed operand without sign extending the first signed operand;
    generating a sign extension adjustment term by forming a value equal to a product of a negative of the second signed operand multiplied by 2N, where N is equal to a bit width of the first signed operand;
    compressing the plurality of partial products and the sign extension adjustment term to form an output product, the sign extension adjustment term correctly implementing sign extension of the first signed operand without delaying the generating of the plurality of partial products.

11. The method of claim 10, wherein the step of generating a plurality of partial products comprises implementing a modified Booth's recoding of the second operand to reduce the plurality of intermediate partial products required.

12. The method of claim 10 further comprising:
    generating the sign extension adjustment term by forming an inverse of the second signed operand;
    appending ones to the inverse; and
    adding one to the inverse after the step of appending ones to the inverse.

13. The method of claim 10 further comprising:
    appending zeroes to the second signed operand;
    inverting the second signed operand having the appended zeroes to form an inverse; and
    adding, when compressing the plurality of intermediate partial products, one to the inverse.

14. The method of claim 10 wherein the plurality of partial products are generated in parallel with generating the sign extension adjustment term to improve processing time required to form the output product.

15. The method of claim 10 where generating the plurality of partial products is implementing with a plurality of carry save adders for generating a sum term and a carry term, and a carry look ahead adder for generating the output product from the sum term and the carry term.

16. The method of claim 10 further comprising:
prior to the step of generating a sign extension adjustment term, determining whether generating the sign extension adjustment term is necessary by verifying that signed operands are being used, that the first signed operand has a negative value, and that the first signed operand has a bit width that is less than a predetermined register width.

17. A multiplier comprising:
a first register for receiving and storing a first operand;
a second register for receiving and storing a second operand;
a modified Booth's recoder coupled to the first register and the second register, the modified Booth's recoding performing a predetermined radix recoding of the second operand;
a plurality of carry save adders coupled to the modified Booth's recoder, the plurality of carry save adders forming a plurality of partial products, at least one of the plurality of carry save adders having an input for receiving a sign extension adjustment term; and
compensation circuitry having an input for receiving the second operand, and having an output coupled to the input of the at least one of the plurality of carry save adders, the compensation circuitry selectively generating the sign extension adjustment term by forming a value equal to a product of a negative of the second operand and 2N, where N is equal to a bit width of the first operand, the compensation circuitry forming the sign extension adjustment term in parallel with the predetermined radix recoding of the second operand.

18. The multiplier of claim 17 wherein the compensation circuitry selectively generates the sign extension adjustment term only when the first operand is a negative signed operand.

19. The multiplier of claim 17 wherein the compensation circuitry further comprises:
a two's complement circuit for forming a two's complement of the second operand to obtain the negative of the second operand; and
logic circuitry for selectively appending bit values of zero to the second operand.

20. The multiplier of claim 19 wherein the two's complement circuit further comprises:
an inverter having an input for receiving the second operand and an output; and
an incrementer having an input coupled to the output of the inverter and an output for providing the output of the inverter incremented by one.

* * * * *